US006554152B2

(12) United States Patent
Smith

(10) Patent No.: US 6,554,152 B2
(45) Date of Patent: Apr. 29, 2003

(54) PROTECTIVE COVER ARTICLE FOR FUEL TANKS, PARTICULARLY THOSE USED IN MOTOR SPORTS

(76) Inventor: Kenneth B. Smith, 18223 152nd Ave. SE., Renton, WA (US) 98058

( * ) Notice: Subject to any disclaimer, the term of this patent is extended or adjusted under 35 U.S.C. 154(b) by 0 days.

(21) Appl. No.: 09/799,951

(22) Filed: Mar. 5, 2001

(65) Prior Publication Data

US 2002/0121522 A1 Sep. 5, 2002

(51) Int. Cl.7 .............................................. B60K 15/00

(52) U.S. Cl. ............................... 220/560.01; 220/4.14; 220/560.02; 150/154

(58) Field of Search ....................... 220/560.01, 560.02, 220/562, 4.14, 4.15, 23.91, 900; 206/83.5; 150/154

(56) References Cited

U.S. PATENT DOCUMENTS

| | | | | |
|---|---|---|---|---|
| 1,477,686 A | * 12/1923 | Braender | 220/560.02 |
| 1,878,063 A | * 9/1932 | Todd | 220/4.14 X |
| 2,403,836 A | * 7/1946 | Wagner | 220/560.02 |
| 2,446,811 A | * 8/1948 | Crawford | 220/4.14 X |
| 3,400,741 A | * 9/1968 | Robinson et al. | 220/4.14 X |
| 3,491,847 A | * 1/1970 | Abbott | 150/154 X |
| 3,782,588 A | * 1/1974 | Allen | 220/900 X |
| 5,020,687 A | * 6/1991 | Seizert | 220/560.01 X |
| 5,255,765 A | * 10/1993 | Schrecongost | 150/154 X |
| 6,145,696 A | * 11/2000 | Duncan | 150/154 X |

* cited by examiner

*Primary Examiner*—Steven Pollard
(74) *Attorney, Agent, or Firm*—Jensen & Puntigam, P.S.

(57) ABSTRACT

The cover member is adapted to receive a fuel-containing cell for a vehicle, such as a stock car racing vehicle, and is configured to cover and fit snugly against substantially all of the surfaces of the fuel cell. The cover member comprises a plurality of layers of penetration-resistant, synthetic material, which is lightweight but high strength, flexible and, to an extent, stretchable, so that in the event of a penetration of the fuel cell by a moving object, such as debris caused by a vehicle crash, material in the vicinity of the penetration is drawn through the opening in the fuel cell with the object, preventing contact of the object and the exposed edges of the opening in the fuel cell.

7 Claims, 4 Drawing Sheets

PROTECTIVE COVER ARTICLE FOR FUEL TANKS, PARTICULARLY THOSE USED IN MOTOR SPORTS

TECHNICAL FIELD

This invention relates generally to protective articles for fuel tanks (cells) used in motor sports, and more particularly concerns a protective cover for such fuel tanks.

BACKGROUND OF THE INVENTION

Referring to FIG. 1, existing racing cars of various kinds, including stock cars, have fuel tanks (cells) 10 which are lightweight, readily removable from the vehicle and at least somewhat exposed. In stock cars, for instance, the fuel tanks 10 are positioned immediately below and extend forwardly from the rear bumper 11 of vehicle 12. Such an exposed position of the fuel tank renders it vulnerable to rupture and the danger of fire and, in extreme cases, explosion, even with a protective bar or bars 13.

High speed crashes between such vehicles, such as occur from time to time in races, result in objects/debris from the vehicles involved penetrating or rupturing the fuel tanks of one or more of the vehicle(s), with a resulting high risk of a serious fire. In addition, substantial contact with a fuel tank on such a vehicle can be made by a direct impact by another vehicle, usually from the rear. This typically results in a rupturing of the tank, and an immediate, large-scale fuel spill. Any spark which results from a metal-to-metal contact, or other cause, such as contact by the fuel with a very hot surface, will result in the spilled fuel igniting into a major fire, spreading very quickly over the area of the spill.

In such cases, there is virtually no time for anyone, including safety personnel, to react in time to contain the fire before it has done significant damage to property and people.

A rupture or puncture of the fuel cell, by another vehicle or flying debris, also can result in fuel being sprayed out from the tank a significant distance. Again, a spark or contact with an extremely hot surface will ignite the fuel. This can involve spectators and crew personnel, in addition to the drivers. Whether or not a true explosion occurs, which is actually not very likely, a large fire ball can still result. Such a fire, due to its size and explosive-like suddenness, can result in significant injuries and, in some cases, death to personnel, as well as property damage. As indicated above, such a fire can involve not only drivers, who are typically at most risk, but crew members and even spectators, when the crash occurs in the close vicinity of spectators or where the vehicle actually goes into the spectator area.

While fuel cells can be made more puncture-resistant by increasing the thickness of the walls of the fuel cell, this adds to the overall weight of the vehicle, which of course is quite undesirable in racing. Thicker wall fuel cells have thus not been well received. Even thickening the walls, however, in many cases will have relatively little positive effect. Further, protecting the fuel cell by moving it to a less accessible portion of the vehicle or by surrounding it in some way with the frame of the vehicle, is also undesirable because quick access and ease of removability/insertion of the fuel tank are important in racing.

It is thus desirable to increase protection of the fuel cell, particularly from penetration, without significantly increasing the overall weight of the vehicle while maintaining accessibility of the fuel cell.

DISCLOSURE OF THE INVENTION

Accordingly, the present invention is a protective cover for a fuel-containing cell for a vehicle, such as for stock car racing cars, comprising: a cover member which is adapted to receive a fuel-containing cell, i.e. fuel tank, the cover member being configured to cover substantially the entire surface area of the fuel cell, the cover member including a portion which is operable to permit convenient insertion and removal of the fuel cell, the cover member further including an opening therein which is in substantial registry with an opening in the fuel cell, for filling of the fuel cell with fuel, wherein the cover member is penetration-resistant so as to minimize the possibility of penetration through a wall of the fuel cell to the interior thereof by a moving object, thereby reducing the incidence of and extent of fire involving fuel escaping from the fuel cell.

BEST MODE FOR CARRYING OUT THE INVENTION

Figure 1:
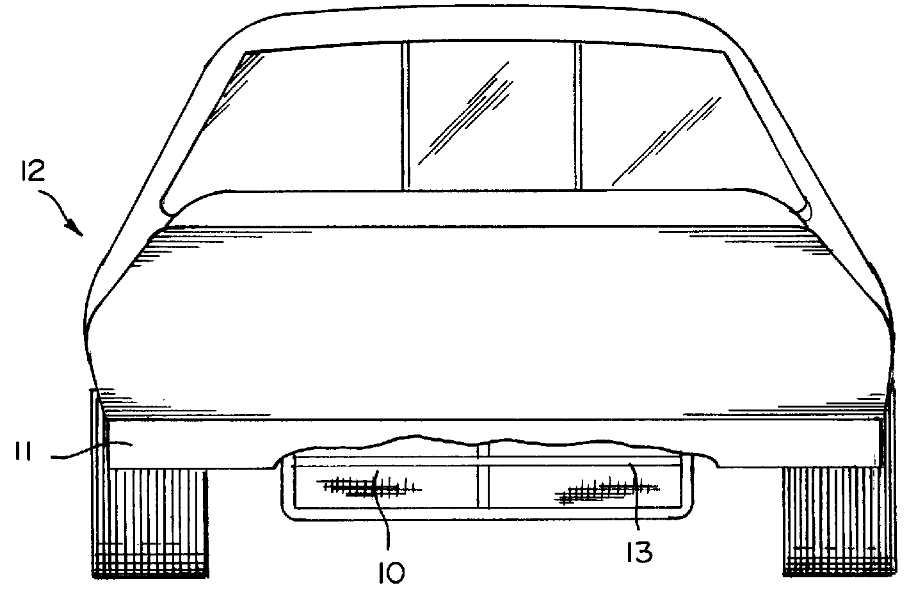
FIG. 1 is a schematic view of a typical stock car-type racecar showing a fuel cell in typical location.
Figure 2:
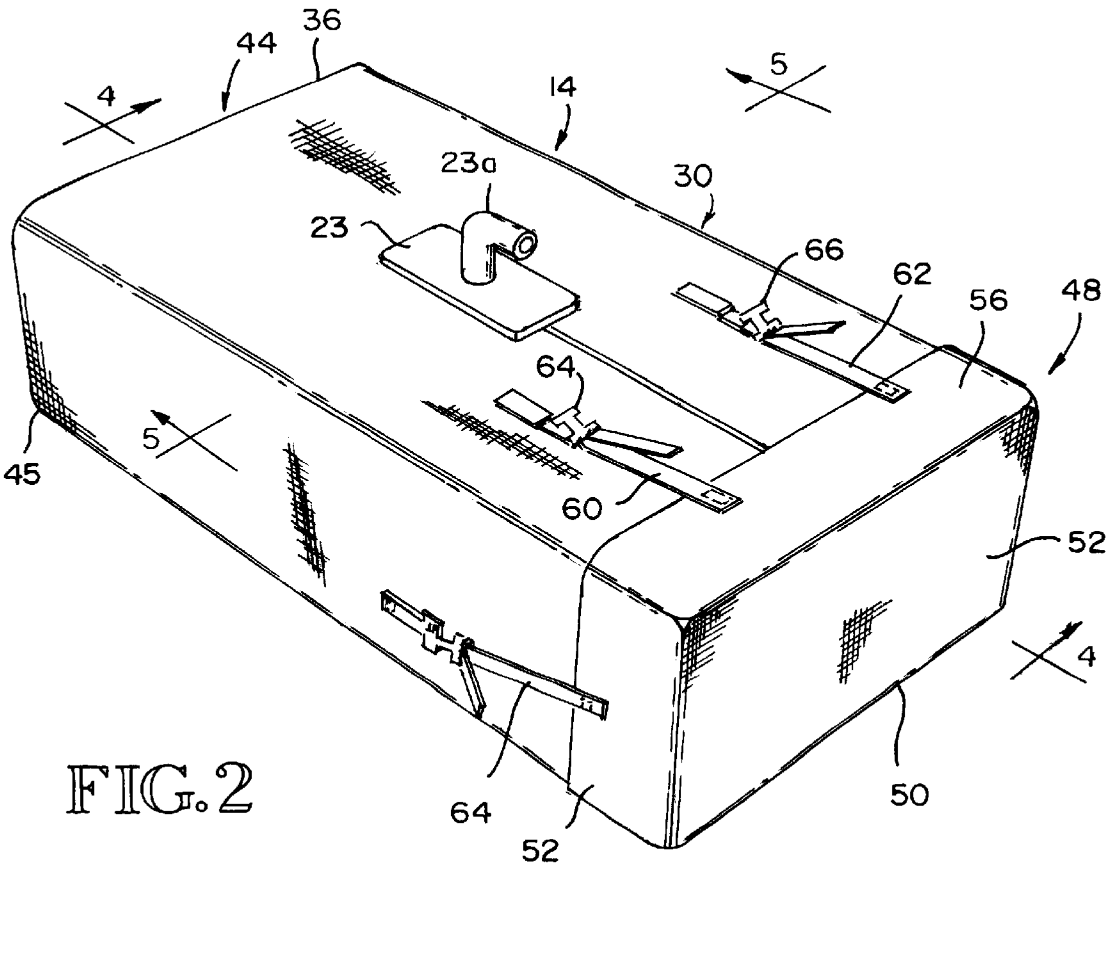
FIG. 2 is a perspective view of the present invention, including a typical fuel cell therein.
Figure 3:
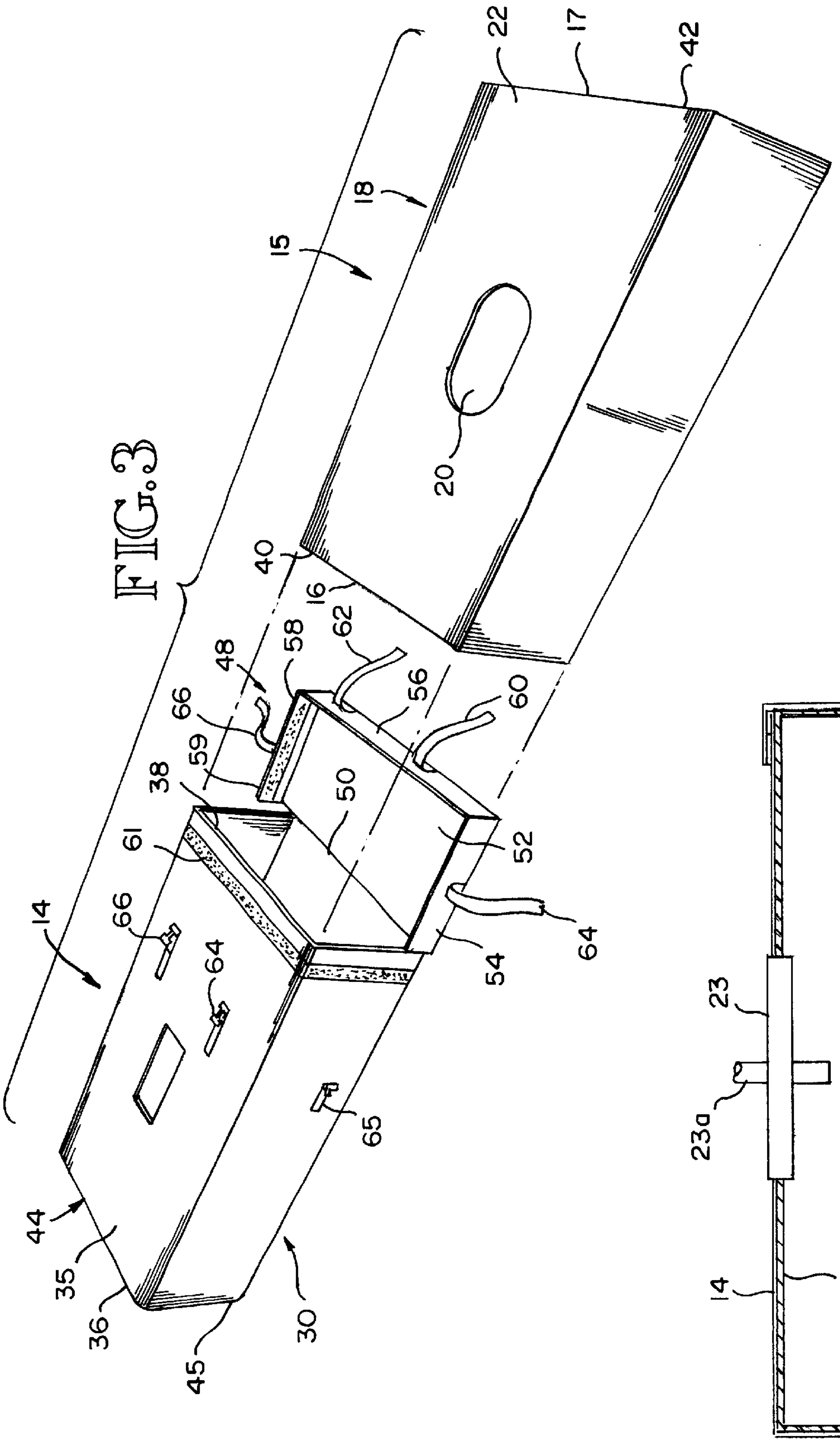
FIG. 3 is a perspective view of the article of claim 1, with the fuel cell shown exploded out of one entry end of the article, the one end being shown in the open position.

FIGS. 2 and 3 show the protective fuel tank (cell) cover of the present invention, generally at 14, in combination with a typical fuel tank/cell 15, which is shown exploded away in FIG. 3. In the embodiment shown, as an example only, fuel tank 15 is generally rectangular in configuration, approximately 33½ inches long by 17 inches deep and 9½ inches high. These dimensions can, of course, vary. Fuel cell 15, again as one example only, is designed for a racing stock car, made of thin-walled steel, with end sections 16 and 17 being riveted/welded to a main body section 18, which is formed in a rectangular section, the resulting open ends of which are closed by end sections 16 and 17, thereby forming a closed container. Fuel cell 15 includes an opening 20 in a top wall 22 thereof, for filling the fuel cell with fuel. A fuel filler gasket 23 fits into opening 20, into which a fuel nozzle 23*a* is inserted (FIG. 2).

The cover for the fuel cell, shown in FIGS. 2 and 3, is a one-piece member in the embodiment shown which is configured to snugly overlay the entire exterior of fuel tank 15. The cover member comprises a plurality of layers of a penetration-resistant, lightweight, flexible material. The number of layers can vary significantly, however, typically in the range of 4 to 20. As indicated above, the material is resistant to penetration but is also lightweight and flexible, so that it can be readily configured to receive the fuel tank. A number of materials are suitable, among them Kevlar®, a para-aramid fiber, which is a specific example of a suitable material.

The material should be fireproof and quite strong, but relatively lightweight. Typically, it will be a synthetic fiber material. The layers of protective material can be covered by other fabrics, if desired, both interiorly and/or exteriorly. Such fabrics include possibly canvas or other heavy-duty material. The cover member includes a main body portion 30. Main body portion 30 is approximately 34 inches by 53 inches and covers (wraps around) the front, back, bottom and top portions of the fuel cell. The main body portion 30 is sewn to form a continuous member. An opening in the top section 35 of the main body portion is in registry with the opening 20 in the top of the fuel cell.

As indicated above, main body portion 30 covers the corresponding main body portion of the fuel cell, i.e. its front, back, bottom and top. The end edges 36 and 38 of the main body portion 30 of the cover member coincide with the end edges 40 and 42 of the fuel cell, when the fuel cell is properly positioned within the cover member. The dimensions of the main body portion are such that the fuel tank 15 fits snugly therein, with the inner surface of the main body portion 30 coming adjacent the exterior surfaces of the corresponding portions of the fuel cell.

In the embodiment shown, the cover member 14 includes a first end portion 44. End portion 44 has dimensions which are substantially similar to the end sections 16, 17 of the fuel cell. End portion 44 extends outwardly from the main body portion 30 of the cover member, and is integral therewith, along lower edge 45 of the main body portion. The three remaining edges of end portion 44 are sewn to the corresponding end edges of the main body portion, forming a permanently closed end. Typically, the sewing is done with high-strength thread, although other means such as straps, rivets, high-strength zippers or other connections could be used. In the embodiment shown, end portion 44 is permanently connected to the main body portion 30, although it could be removable, like the other portion 48, which is described immediately below. While end portion 44 extends from the main body portion, it could be completely separate.

End portion 48 opposes end portion 44 and covers the corresponding end section 17 of the fuel tank. In the embodiment shown, end portion 48 is partially removably secured to the main body portion 30 by rotating the end portion away from the main body portion about lower edge 50, to permit the convenient insertion and removal of the fuel tank from the cover member. End portion 48 extends from and is integral with the main body portion 30 along lower edge 50. The dimensions of end portion 48 are slightly larger, by several inches, in both length and width, than end portion 44, so that end portion 48 overlays an end boundary part of the front, back and top of the main body portion when end portion 48 is in place against end section 17 of the fuel tank.

End portion 48 is configured like a shallow box top, with a base part 52 and edge parts 54, 56 and 58 which extend partially over corresponding parts of the front, back and top of the main body portion 30, by a distance of approximately 4½ inches in the embodiment shown. On the interior surface of edge parts 54, 56 and 58 of end portion 48 is a continuous 2-inch wide Velcro® strip 59. A mating continuous Velcro strip 61 extends around end boundary parts of the front, back and top of the main body portion. The two mating Velcro strips provide one means of attachment of the removable end portion 48 to the main body portion 30 of the cover member.

In addition, in the embodiment shown, two straps 60 and 62 connect edge part 56 of end portion 48 to the top of the main body portion 30. The straps 60, 62 are secured by heavy-duty thread to edge part 56, while heavy-duty buckles 64, 66 are sewn to the top of main body portion 30. In the embodiment shown, the two buckles 64, 66 are approximately 10 inches apart, center to center. The location and number of the strap/buckle combinations can, of course, be varied.

In addition, similar strap/buckle combinations are provided between edge parts 54 and 58 of end portion 48 and the front and back of the main body portion 30. Straps 64, 66 are sewn to the edge parts, while buckle 65 is sewn to the front of the main body portion, approximately central between the bottom and top of the cover member. A similar buckle is sewn to the back of the main body portion. When end portion 48 is positioned so that the two Velcro sections 59, 61 mate together and the strap and buckle combinations are operatively connected, an extremely strong connection between end portion 48 and main body portion 30 results.

The overall result is a substantially unitary cover member which completely covers every surface of the fuel cell contained therein. It should be understood, however, that other arrangements could be devised, including the use of other connecting elements, such as snaps, zippers and other arrangements.

Figure 6:
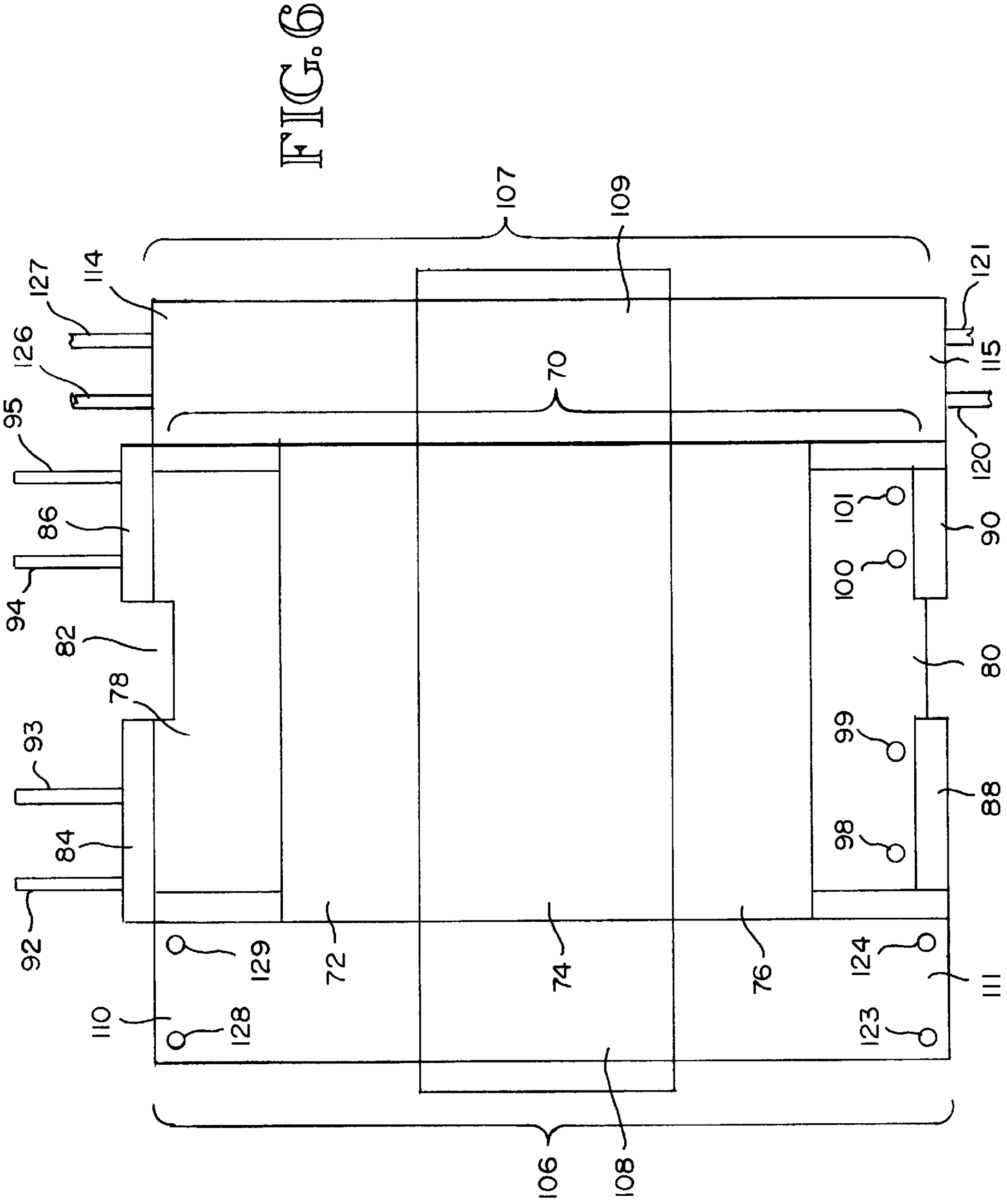
FIG. 6 is a top view of a slightly different embodiment of the present invention, shown in a folded-out arrangement, without the fuel cell.

FIG. 6 shows an outline of a somewhat different but essentially equivalent cover member configuration. In this arrangement, a main body portion 70 wraps around the bottom, front and back of the fuel tank, with parts 72, 74 and 76, respectively. The opposing end sections 78 and 80 of the main body portion slightly overlap to form the top of the cover member, with an opening 82 in registry with the opening in the fuel tank. Velcro sections 84, 86 on end section 78 mate with Velcro sections 88, 90 on end section 80. Straps 92–95 mate with latches 98–101 to assist in connecting the main body portion together.

End portions 106 and 107 of the cover member include, respectively, a center part 108, 109, respectively, which abut the ends of the fuel tank, as well as front and back flaps 110, 111 and 114, 115 which overlay end boundary portions of the front, back and top parts of the main body portion when the end portions are folded into position. The end portions are secured together with strap and buckle combinations (straps 120, 121 with buckles 123, 124 and straps 126, 127 with buckles 128, 129) to form a secure, unitary cover enclosing the fuel tank. Other specific structural arrangements could be used.

Also, it should be understood that the cover member could be constructed so that the fuel tank can be inserted and removed in other ways. For instance, an opening could be made longitudinally of a cover member with permanently closed end portions, either along the top or bottom or even the sides which would extend a sufficient length so that the cover member could be pulled apart sufficiently to permit insertion and/or removal of a fuel cell. The exposed opening edges of the cover element could be connectable in various ways to form the desirable unitary cover structure. In still other arrangements, the top and bottom parts of the cover member could be partially removable, like a flap, or a section of the cover member could be made completely separable from the remainder thereof to permit the insertion/removal of the fuel tank.

The primary advantage of the disclosed material, such as Kevlar®, is its resistance to penetration by high-speed debris. Ideally, the material is strong enough (or enough layers used) to prevent any penetration of the fuel cell, so that there will be no loss or leakage of fuel, and hence no possible fire due to escape of fuel from the fuel tank and subsequent ignition.

In the event that a penetration does occur with such material, it is likely that it will be relatively small and localized, with only minor spillage. If a fire does occur from such minor fuel spills, it will typically be relatively small, without the fuel cell itself and the fuel therein becoming engaged in the fire, at least initially, permitting the driver, safety personnel, crew members and spectators where necessary sufficient time to move to safety away from the vehicle. Fire crews could also have more time to safely move in and extinguish the fire. Any penetration which does occur will be far less severe than without the cover member. The extent of the penetration and/or the number of penetrations will be decreased significantly. This alone will reduce the risk and/or extent of any fire which may result.

Figure 4:
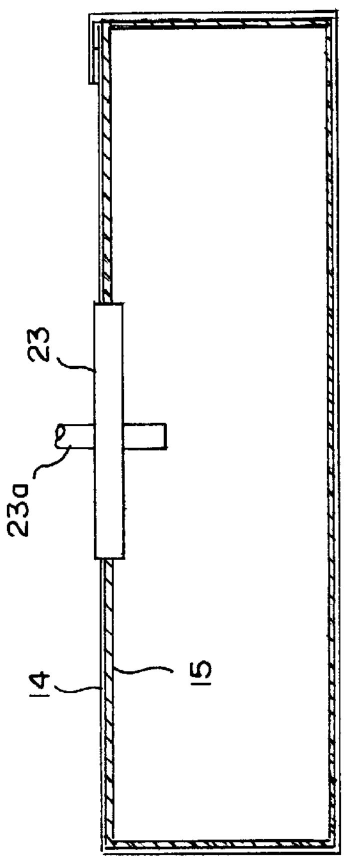
FIG. 4 is a longitudinal cross-sectional view of the combination of FIG. 2.
Figure 5:
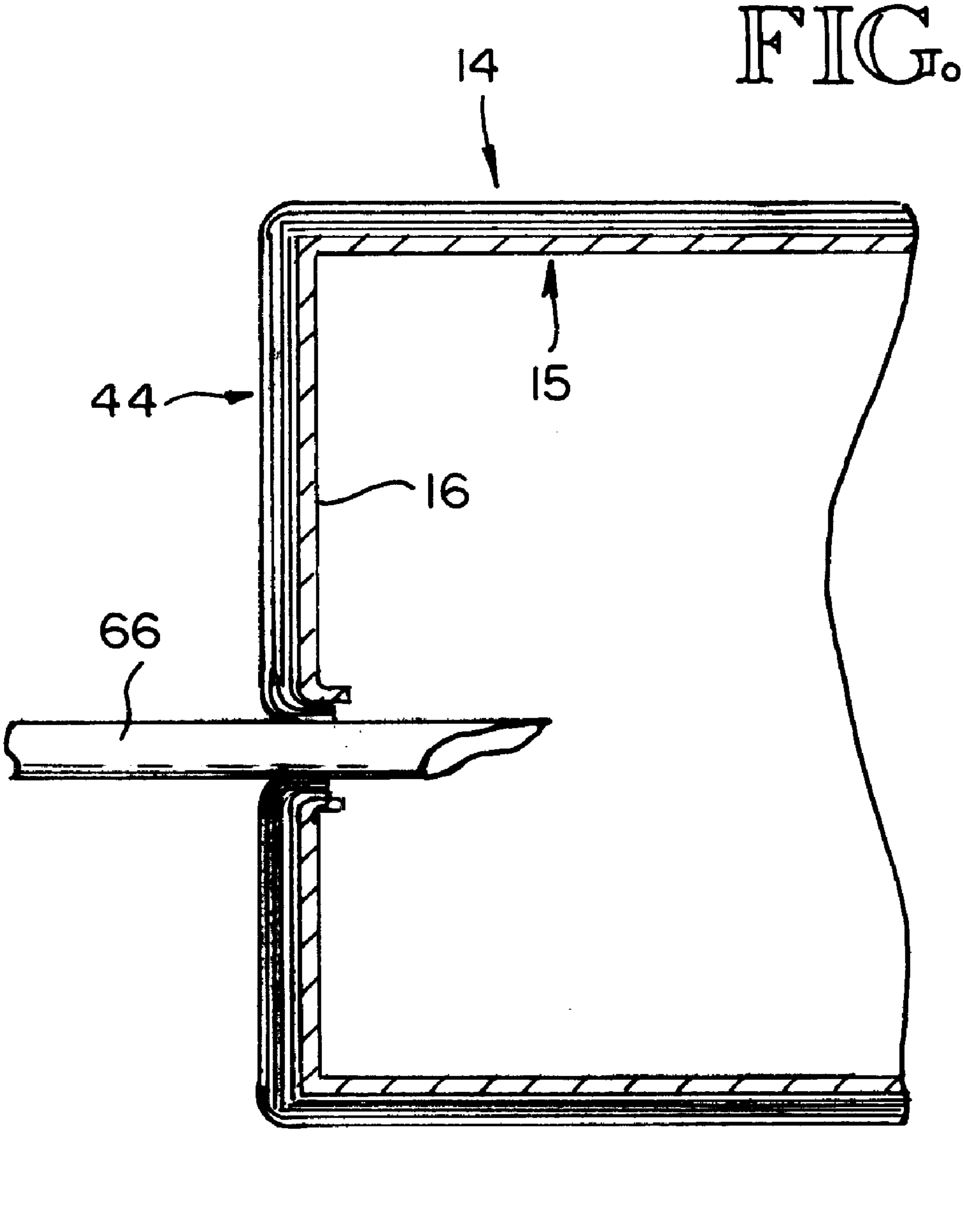
FIG. 5 is a lateral cross-sectional view of the combination of FIG. 2, showing a penetration of the fuel cell.

Besides at least reducing the extent and number of penetrations of the fuel cell, the cover member of the present invention significantly reduces the possibility of a spark, and hence the creation of a fire, if penetration does occur. FIG. 4 illustrates this capability. When an object/debris of any kind, shown at 66 in FIG. 4, penetrates the cover member 130 and the fuel tank 132, the act of penetration draws a small portion of the cover member 130 into the interior of the fuel tank along with the object, thereby shielding the edges of the opening of the metal tank from contact with the object, which is also frequently metal. Hence, direct contact between the penetrating object and an exposed edge of the fuel tank is prevented. This significantly reduces the chances of a spark being created by the action of penetration, thereby reducing the possibility of a fire due to a stray spark.

Accordingly, even if penetration does occur, both the extent of the penetration and the chances of a spark occurring because of a penetration are significantly reduced. Both of these accordingly reduce the chances of a fire occurring. Still further, as discussed above, even if a fire does occur, the extent of the fire and the speed of the fire will be likely significantly reduced. All of this provides an opportunity for those in the proximity of the crash to get safely away from the vehicle(s) involved.

Hence, a new protective cover member for fuel tanks has been disclosed. The cover member is particularly useful for fuel tanks used in motor sports, such fuel tanks being typically quite accessible, with weight being a significant issue. The invention significantly reduces the chances of penetration of the fuel tank without adding significantly to the overall weight of the vehicle. Even if a penetration does occur, the chances of a significant fire occurring are substantially reduced.

Although a preferred embodiment of the invention has been disclosed herein for purposes of illustration, it should be understood that various changes, modifications and substitutions may be incorporated without departing from the spirit of the invention, which is defined by the claims which follow.

What is claimed is:

1. A protective cover for a fuel-containing cell for a vehicle, comprising:

a cover member adapted to receive a fuel-containing cell, the cover member being configured to cover substantially the entire surface area of the fuel cell, the cover member being fireproof, flexible and readily openable and closable to permit convenient insertion and removal of the fuel cell, permitting the cover to be retrofitted to an existing fuel cell, the cover member further including an opening therein in substantial registry with an opening in the fuel cell, for filling of the fuel cell with fuel, wherein the cover member is penetration-resistant and impact resistant so as to minimize the possibility of penetration through the fuel cell to the interior thereof by a moving object, thereby reducing the incidence of and extent of fire involving fuel escaping from the fuel cell.

2. An article of claim 1, wherein the cover member comprises a plurality of separate layers of penetration-resistant, synthetic material.

3. An article of claim 2, wherein the material is lightweight compared to the fuel cell material, stronger than the fuel cell material and flexible, so that it can be made to fit snugly around the fuel cell.

4. An article of claim 3, wherein the material is sufficiently stretchable that if a penetration of the fuel cell occurs, the material in the immediate vicinity thereof is drawn into the fuel cell around the penetration, protecting against contact between a penetrating object and an edge of the penetration in the fuel cell, reducing the possibility of a spark occurring between the object and the fuel cell.

5. An article of claim 1, wherein the cover member includes at least one end portion which is at least partially removable from the remainder of the cover member, permitting insertion and removal of the fuel cell from the cover member, the end portion including a first attachment strip around a substantial portion thereof, which connects with a mating strip on a remainder portion of the cover member, and a plurality of strap/buckle combinations on the end portion and the remainder portion of the cover member to securely connect said end portion to the remainder portion of the cover member.

6. An article of claim 5, wherein the cover member is configured to fit snugly against all surfaces of the fuel cell.

7. An article of claim 5, wherein said partially removable end portion includes a part thereof which is integral with and extends from the remainder portion of the cover member.

* * * * *